United States Patent
Ekonen

(10) Patent No.: US 9,062,767 B1
(45) Date of Patent: Jun. 23, 2015

(54) MULTI-WHEEL DRIVE SYSTEM AND METHOD OF CONTROL

(71) Applicant: ArvinMeritor Technology, LLC, Troy, MI (US)

(72) Inventor: Todd R. Ekonen, Howell, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/198,745

(22) Filed: Mar. 6, 2014

(51) Int. Cl.
*B60K 17/356* (2006.01)
*F16H 61/4061* (2010.01)
*F15B 7/00* (2006.01)
*B60K 17/10* (2006.01)

(52) U.S. Cl.
CPC ............ *F16H 61/4061* (2013.01); *F15B 7/003* (2013.01); *B60K 17/105* (2013.01)

(58) Field of Classification Search
CPC .............................. B60K 17/10; B60K 17/105
USPC .......................................... 180/242, 305, 307
See application file for complete search history.

(56) References Cited

U.S. PATENT DOCUMENTS

| 4,145,167 | A | 3/1979 | Baatrup |
| 4,253,807 | A | 3/1981 | Pahl |
| 7,500,361 | B2 * | 3/2009 | Ohashi ............................ 60/444 |
| 2003/0162618 | A1 * | 8/2003 | Hasegawa et al. .............. 475/72 |

\* cited by examiner

*Primary Examiner* — Jeffrey J Restifo
*Assistant Examiner* — Erez Gurari
(74) *Attorney, Agent, or Firm* — Brooks Kushman P.C.

(57) ABSTRACT

A multi-wheel drive system for a vehicle and a method of control. The system may include first and second inlet valves that may control the flow of fluid to a gerotor pump that may actuate a clutch to provide torque to a wheel set.

20 Claims, 2 Drawing Sheets

MULTI-WHEEL DRIVE SYSTEM AND METHOD OF CONTROL

TECHNICAL FIELD

This patent application relates to a multi-wheel drive system for a vehicle and a method of control.

BACKGROUND

A fluid pressure operated wheel drive is disclosed in U.S. Pat. No. 4,253,807.

SUMMARY

In at least one embodiment, a multi-wheel drive system for a vehicle is provided. The system may include a gerotor pump assembly, a fluid source, a first inlet valve, and a second inlet valve. The gerotor pump assembly may have a first shaft that may provide torque to a gerotor pump and a second shaft that may be connected to a second wheel set. The fluid source may be configured to provide a fluid to the gerotor pump assembly. The first and second inlet valves may be disposed in parallel and may be fluidly connected to the fluid source and the gerotor pump assembly. The gerotor pump assembly may provide torque to the second wheel set when the first inlet valve is open, the second inlet valve is closed, and the first shaft rotates in a first rotational direction. The gerotor pump assembly may provide torque to the second wheel set when the first inlet valve is closed, the second inlet valve is open, and the first shaft rotates in a second rotational direction.

In at least one embodiment, a method of controlling a multi-wheel drive system for a vehicle is provided. The method may include providing a gerotor pump assembly that may have a gerotor pump, a clutch, a first shaft, and a second shaft. The clutch may be actuated by a fluid provided by the gerotor pump. The first shaft may be operatively coupled to a first wheel set, the gerotor pump, and the clutch. The second shaft may be operatively coupled to a second wheel set and the clutch. The gerotor pump may be selectively fluidly coupled to the fluid source by a first inlet valve and a second inlet valve. The fluid may be provided to the gerotor pump to actuate the clutch to provide torque to the second wheel set by opening the first inlet valve and closing the second inlet valve when the first shaft rotates in a first rotational direction.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
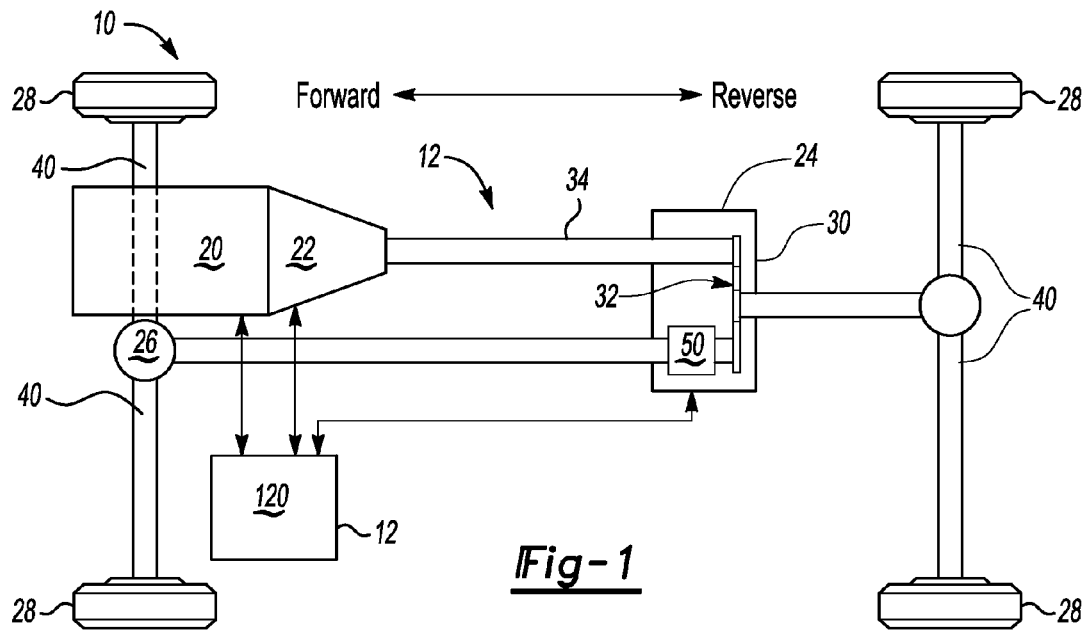
FIG. 1 is a schematic of an exemplary vehicle having a gerotor pump assembly.

Referring to FIG. 1, an exemplary vehicle 10 is shown. The vehicle 10 may be a motor vehicle, such as a truck, military transport or weaponry vehicle, farm equipment, material handling vehicle, or a cargo or container loader for air, land, or marine vessels.

The vehicle 10 may have a drivetrain 12 that may provide torque to one or more traction wheel assemblies to propel the vehicle 10. The drivetrain 12 may have a hybrid configuration that may employ multiple power sources or a non-hybrid configuration. In a non-hybrid configuration, the drivetrain 12 may include an engine 20, a transmission 22, a transfer case, 24, and at least one drive axle assembly 26.

The engine 20 may provide power that may be used to rotate one or more wheel assemblies 28. For example, the vehicle 10 may have a set of wheel assemblies 28 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art. The transmission 22 may be spaced apart from the transfer case 24.

The transfer case 24 may be configured to provide propulsion torque to one or more wheel assemblies or wheel sets. The transfer case 24 may include a housing 30 and a gear set 32.

The housing 30 may receive various components of the transfer case 24. In addition, the housing 30 may facilitate mounting of the transfer case 24 to the vehicle 10.

The gear set 32 may transmit torque to one or more wheel assemblies or wheel sets. The input of the transfer case 24 may be coupled to an output of the transmission 22, such as with a drive shaft 34. Torque that is provided to the input of the transfer case 24 may then be transmitted through the gear set 32 to at least one output. Each output of the transfer case 24 may be associated with a corresponding wheel set. In FIG. 1, a first wheel set 36 and a second wheel set 38 are shown. The first wheel set 36 is shown at a rear end of the vehicle 10 and may provide rear wheel drive while the second wheel set 38 is disposed forward of the first wheel set 36 and may provide front wheel drive. It is contemplated that the positioning of the first wheel set 36 and the second wheel set 38 may be interchanged or modified from the configuration shown in FIG. 1 in one or more embodiments. The transfer case 24 may provide torque to a single drive axle assembly 26 or a single wheel set or multiple drive axle assemblies 26 or multiple wheel sets to provide a multi-wheel or all-wheel drive (AWD) operation mode as will be discussed in more detail below.

A drive axle assembly 26 may receive torque from the transfer case 24 and transmit torque to one or more associated traction wheel assemblies via an associated axle 40. Each axle 40 may interconnect a differential (not shown) to at least one associated wheel hub assembly that may facilitate mounting of a wheel assembly 28. For example, a wheel assembly 28 may be mounted on and may rotate with the wheel hub assembly.

Figure 2:
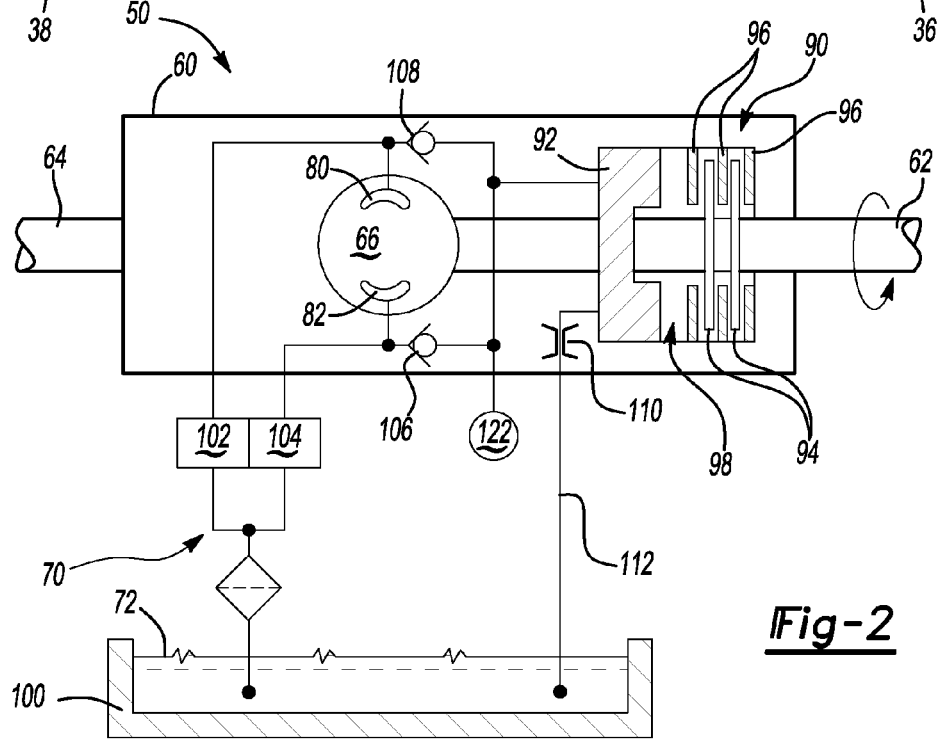
FIG. 2 is a schematic of the gerotor pump assembly in a neutral position.

Referring to FIGS. 1 and 2, a gerotor pump assembly 50 is shown. The gerotor pump assembly 50 may selectively provide torque to a wheel set, such as the second wheel set 38. The gerotor pump assembly 50 may be disposed between the gear set 32 and second wheel set 38. In at least one embodiment, the gerotor pump assembly 50 may be disposed in the housing 30 of the transfer case 24. As is best shown in FIG. 2, the gerotor pump assembly 50 may include a gerotor pump housing 60, a first shaft 62, a second shaft 64, a gerotor pump 66, a clutch subassembly 68, and a fluid circuit 70.

The gerotor pump housing 60 may receive various components of the gerotor pump assembly 50. In addition, the gerotor pump housing 60 may facilitate mounting of the gerotor pump assembly 50 to the transfer case 24.

The first shaft 62 may receive torque from the gear set 32 and may extend from the gear set 32 to the gerotor pump 66. For instance, the first shaft 62 may be fixedly coupled to an inner rotor of the gerotor pump 66 and may rotate with respect to the gerotor pump housing 60. The first shaft 62 may be configured to rotate about an axis in either a first rotational direction or a second rotational direction that may be opposite the first rotational direction. For example, the first shaft 62 may rotate in the first rotational direction when a forward gear ratio of the transmission 22 and/or transfer case 24 is engaged. Similarly, the first shaft 62 may rotate in the second rotational direction when a reverse gear ratio of the transmission 22 and/or transfer case 24 is engaged. In at least one embodiment, clutch plates of the clutch subassembly 68 may be coupled to the first shaft 62 between the gear set 32 and the gerotor pump 66.

The second shaft 64 may be spaced apart from and may be coaxially disposed with the first shaft 62. The second shaft 64 may extend from the gerotor pump housing 60 to a drive axle assembly 26 that may be associated with the second wheel set 38. For instance, the second shaft 64 may be fixedly coupled to the gerotor pump housing 60 and may provide torque to the second wheel set 38 when the clutch subassembly 68 is actuated or engaged as will be discussed in more detail below.

The gerotor pump 66 may be configured to actuate the clutch subassembly 68. More specifically, the gerotor pump 66 may be configured to provide a pressurized fluid to actuate the clutch subassembly 68 such that torque may be transmitted to the second wheel set 38. The gerotor pump 66 may be a positive displacement pump that may have an inner rotor that may rotate within and with respect to an outer rotor that may be fixedly disposed with respect to the gerotor pump housing 60. For example, the inner rotor may rotate with respect to the outer rotor and an eccentric relationship. As the inner rotor rotates, a partial vacuum may be created between the inner rotor and the outer rotor that may draw fluid 72 through a port and into gerotor pump 66. As the inner rotor continues to rotate, the volume between the inner rotor and the outer rotor may be progressively reduced in size and the fluid may be discharged through another port. In FIG. 2, the gerotor pump 66 is shown with a first port 80 and a second port 82. The flow of fluid through the first port 80 and a second port 82 may be based on the direction of rotation of the first shaft 62. For example, the first port 80 may be an inlet that may receive fluid and the second port 82 may be an outlet when the first shaft 62 rotates in the first rotational direction. Conversely, the second port 82 may be an inlet and the first port 80 may be an outlet when the first shaft 62 rotates in the second rotational direction. The gerotor pump 66 may be activated or may operate when there are speed differences between the first shaft 62 and the second shaft 64 or speed differences between the first wheel set 36 and the second wheel set 38.

The clutch subassembly 68 may be selectively coupled to provide a torque path between the first shaft 62 and the second shaft 64. The clutch subassembly 68 may have any suitable configuration. In the embodiment shown in FIG. 2, the clutch subassembly 68 may include a clutch 90 and a piston 92.

The clutch 90 may be configured to transmit torque between the first shaft 62 and the second shaft 64. More specifically, torque may not be transmitted from the first shaft 62 to the second shaft 64 when the clutch 90 is in a disengaged position, while torque may be transmitted from the first shaft 62 to the second shaft 64 when the clutch 90 is in an engaged position. The clutch 90 may have any suitable configuration. For example, the clutch 90 may be a friction clutch. For illustration purposes, FIG. 2 shows a clutch 90 that may include one or more first clutch plates 94 and one or more second clutch plates 96. The first clutch plate 94 may be coupled to and may rotate with the first shaft 62. The second clutch plate 96 may be coupled to and may rotate with the gerotor pump housing 60.

The piston 92 may be configured to actuate the clutch 90. For example, the piston 92 may exert force that may cause the clutch 90 to move from the disengaged position to the engaged position. The first and second sets of clutch plates 94, 96 may be engaged and may cooperate to transmit torque from the first shaft 62 to the second shaft 64 when a sufficient engagement force is provided with the piston 92. The first and second sets of clutch plates 94, 96 may be disengaged and may not cooperate to transmit torque from the first shaft 62 to the second shaft 64 when a sufficient engagement force is not provided with the piston 92. In at least one embodiment, the piston 92 may be movably disposed in a piston cavity 98 and may be actuated by pressure exerted by the fluid provided by the gerotor pump 66. For instance, sufficient hydraulic pressure may actuate the piston 92 between a retracted position in which the clutch 90 may be disengaged and an extended position in which the clutch 90 may be engaged.

The fluid circuit 70 may be configured to provide and route fluid 72 through the gerotor pump assembly 50. In at least one embodiment, the fluid circuit 70 may include a fluid source 100, a first inlet valve 102, a second inlet valve 104, a first check valve 106, and a second check valve 108, and a restriction 110. Passages or conduits, such as a hose, tubing, or the like may be provided to connect various components of the fluid circuit 70. Moreover, rotational seals may be provided with such passages or conduits where these components interface with (e.g., enter or exit) the gerotor pump housing 60.

The fluid source 100 may be configured to supply or store a volume of a fluid 72, such as a liquid like hydraulic fluid or oil. For example, the fluid source 100 may be a tank or sump portion of the transfer case 24.

The first inlet valve 102 may be fluidly connected to the fluid source 100 and may be disposed between the fluid source 100 and the first port 80. The first inlet valve 102 may have any suitable configuration. For example, the first inlet valve 102 may be a two position solenoid valve or may be part of a multi-position solenoid valve that may include the second inlet valve 104 or integrate the functionality of the second inlet valve 104. The first inlet valve 102 may move between an open position and a closed position. The first inlet valve 102 may permit the fluid 72 to flow from the fluid source 100 to the first port 80 when in the open position. The first inlet valve 102 may inhibit the fluid 72 from flowing from the fluid source 100 to the first port 80 when in the closed position.

The second inlet valve 104 may be fluidly connected to the fluid source 100 and may be disposed between the fluid source 100 and the second port 82. The second inlet valve 104 may permit the fluid 72 to flow from the fluid source 100 to the second port 82 when in the open position. The second inlet valve 104 may inhibit the fluid 72 from flowing from the fluid source 100 to the second port 82 when in the closed position. The second inlet valve 104 may be provided in parallel with the first inlet valve 102. As such, the fluid 72 from the fluid source 100 may flow into either the first inlet valve 102 or the second inlet valve 104, but not into the first and second inlet valves 102, 104.

The first check valve 106 may be disposed between the second port 82 and the piston cavity 98. The first check valve 106 may permit the fluid 72 to flow from the second port 82 to the piston cavity 98 and may inhibit flow from the piston cavity 98 to the second port 82. Fluid 72 may flow through the first check valve 106 when the first inlet valve 102 is open and the second inlet valve 104 is closed as will be discussed in more detail below.

The second check valve 108 may be disposed between the first port 80 and the piston cavity 98. The second check valve 108 may permit the fluid 72 to flow from the first port 80 to the piston cavity 98 and may inhibit flow from the piston cavity 98 to the first port 80. Fluid 72 may flow through the second check valve 108 when the first inlet valve 102 is closed and the second inlet valve 104 is open as will be discussed in more detail below.

The restriction 110 may be disposed in a return line 112 that may be fluidly connected to an outlet of the piston cavity 98 and that may route the fluid 72 from the piston cavity 98 back to the fluid source 100. The restriction 110 may have any suitable configuration. For example, the restriction 110 may be configured as a passive device, such as an orifice tube or an active device, such as an adjustable valve. The restriction 110 may restrict fluid flow or the fluid flow rate out of the piston cavity 98. As such, pressurized fluid may enter the piston cavity 98 at a faster rate than the pressurized fluid exits the piston cavity 98 to help control, maintain, and/or stabilize pressure on the piston 92 and provide smooth engagement control of the clutch 90.

Referring to FIG. 1, one or more control modules or controllers 120 may be provided to monitor and control various components and systems of the vehicle 10. For example, the controller 120 may be a microprocessor-based controller and may be electrically connected to or communicate with components of the drivetrain 12, such as the engine 20 and transmission 22, to monitor and control their operation and performance. The controller 120 may also monitor and control actuation of the first inlet valve 102 and the second inlet valve 104 and optionally the restriction 110. For simplicity, a single controller is shown in FIG. 1; however, it is contemplated that multiple control modules or controllers or a distributed control architecture may be provided with the vehicle 10. In addition, the controller 120 may also process input signals or data from various input devices or sensors, such as a pressure sensor 122.

Referring to FIG. 2, the pressure sensor 122 may detect fluid pressure between the gerotor pump 66 and the piston 92. For example, the pressure sensor 122 may detect fluid pressure between the piston 92 and the first and second check valves 106, 108. A signal or data from the pressure sensor 122 may be used to provide feedback regarding the fluid pressure that is provided to actuate the piston 92 and may be used to control modulation of the first inlet valve 102 and/or the second inlet valve 104 to control the amount of fluid 72 that is provided to the gerotor pump 66 and the piston 92, which in turn may control engagement and/or slippage of the clutch 90 and hence may control the amount of torque that is provided to the second wheel set 38.

Figure 3:
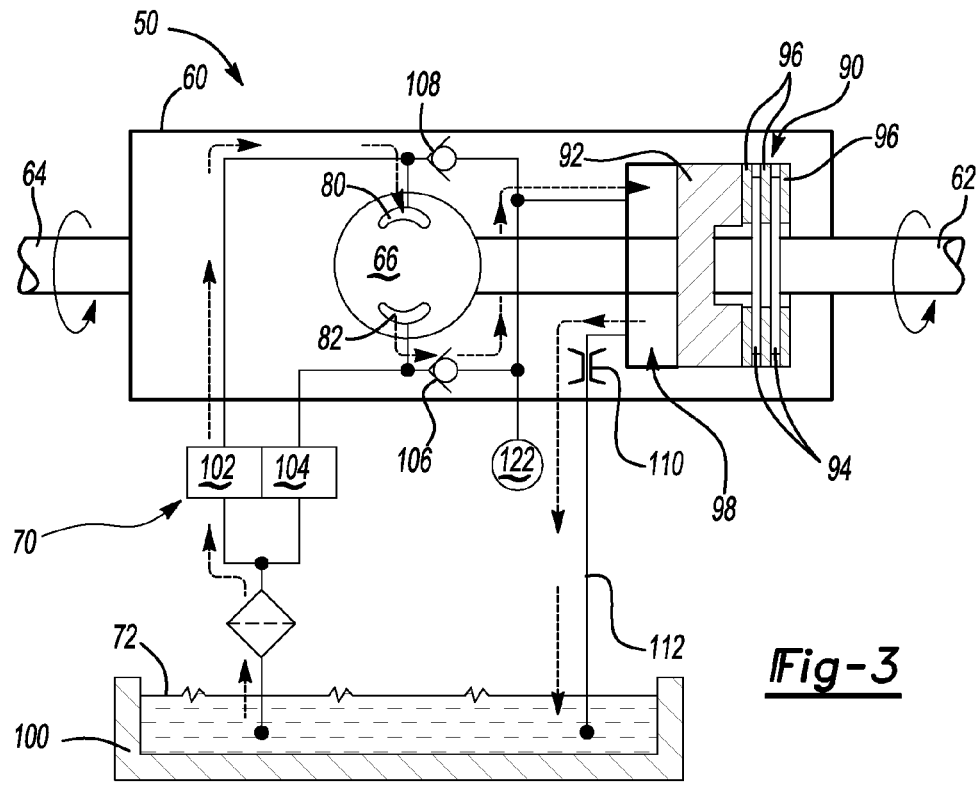
FIG. 3 is a schematic of the gerotor pump assembly providing torque to a second wheel set when the vehicle is configured to move in a first direction.
Figure 4:
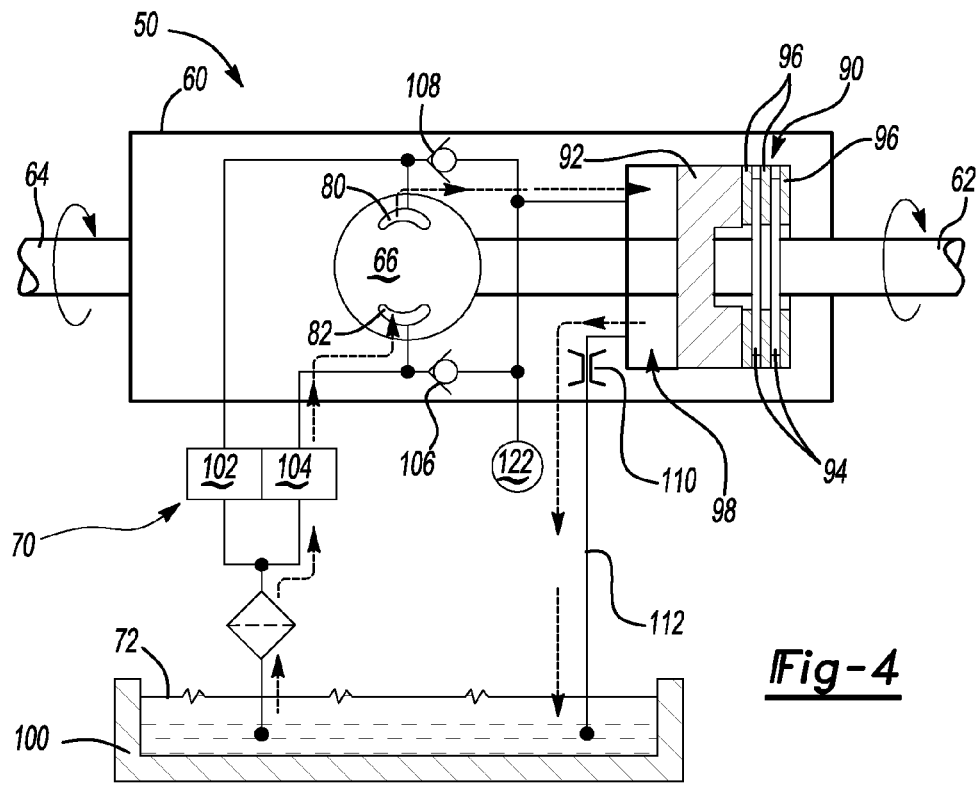
FIG. 4 is a schematic of the gerotor pump assembly providing torque to the second wheel set when the vehicle is configured to move in a second direction.

Referring to FIGS. 2-4, operation modes of the transfer case 24 will now be discussed in more detail. In FIGS. 2-4, arrowed lines depict fluid flow through the fluid circuit 70 and the curved arrows near the first shaft 62 and the second shaft 64 represent shaft rotational directions.

In FIG. 2, the gerotor pump assembly 50 is shown in a neutral position or neutral operation mode. In the neutral position, torque is not provided from the first shaft 62 to the second shaft 64 and the second wheel set 38. The gerotor pump assembly 50 may be in the neutral position as a default operating condition. The first inlet valve 102 and the second inlet valve 104 may both be in the open position in the neutral operation mode. As such, the gerotor pump 66 may not provide fluid 72 to the piston cavity 98 to actuate the piston 92 to engage the clutch 90.

In FIG. 3, the gerotor pump assembly 50 is shown in a forward direction multi-wheel drive operation mode. This mode may be selected when torque is provided to propel the vehicle 10 in a first direction, which may be a forward direction. As such, torque may be provided to the first wheel set 36 by the transfer case 24 and may rotate the first shaft 62 and the gerotor pump 66 in a first rotational direction. In this operation mode, the gerotor pump assembly 50 may provide torque to the second wheel set 38 when there are speed differences between the first wheel set 36 and the second wheel set 38. More specifically, the first inlet valve 102 may be opened and the second inlet valve 104 may be closed by the controller 120. As such, the fluid 72 may flow from the fluid source 100 through the first inlet valve 102 and to the first port 80 of the gerotor pump 66. The gerotor pump 66 may discharge pressurized fluid 72 through the second port 82 and the first check valve 106. The pressurized fluid 72 may be inhibited from flowing back to the first port 80 by the second check valve 108. As such, the pressurized fluid 72 may enter the inlet of the piston cavity 98 and exert force on the piston 92 to actuate the clutch from the disengaged position toward the engaged position. The pressurized fluid 72 may return to the fluid source 100 via the return line 112 at a slower rate than the pressurized fluid 72 enters the inlet of the piston cavity 98 due to the restriction 110.

In FIG. 4, the gerotor pump assembly 50 is shown in a reverse direction multi-wheel drive operation mode. This mode may be selected when torque is provided to propel the vehicle 10 in a second direction, which may be a reverse direction. As such, torque may be provided to the first wheel set 36 by the transfer case 24 and may rotate the first shaft 62 and the gerotor pump 66 in a second rotational direction. In this operation mode, the gerotor pump assembly 50 may operate in a reverse direction as compared to FIG. 3 to provide torque to the second wheel set 38 when there are speed differences between the first wheel set 36 and the second wheel set 38. More specifically, the first inlet valve 102 may be closed and the second inlet valve 104 may be opened by the controller 120. As such, the fluid 72 may flow from the fluid source 100 through the second inlet valve 104 and to the second port 82 of the gerotor pump 66. The gerotor pump 66 may discharge pressurized fluid 72 through the first port 82 and the second check valve 108. The pressurized fluid 72 may be inhibited from flowing back to the second port 82 by the first check valve 106. As such, the pressurized fluid 72 may enter the inlet of the piston cavity 98 and exert force on the piston 92 to actuate the clutch from the disengaged position toward the engaged position. The pressurized fluid 72 may return to the fluid source 100 via the return line 112 at a slower rate than the pressurized fluid 72 enters the inlet of the piston cavity 98 due to the restriction 110.

The controller 120 may operate the gerotor pump assembly 50 to provide torque to the second wheel set 38 based on various inputs. For example, the controller 120 may provide torque to the second wheel set 38 based on a manual command from a vehicle operator. In addition, the controller may provide torque to the second wheel set 38 automatically based on various inputs. For example, torque may be provided to the second wheel set 38 when wheel slip is detected or when an anti-lock brake control strategy or traction control strategy is activated. Wheel slip may be expressed as a wheel slip ratio that may be representative of a ratio of the rotational speed of a braked wheel to that of an equivalent free rolling wheel and may be based on data indicative of wheel rotational speed, vehicle speed, and a brake command. A selected gear ratio (forward gear ratio or reverse gear ratio) may be used as an input to determine the direction of vehicle travel and whether to implement the forward direction multi-wheel drive operation mode or reverse direction multi-wheel drive operation mode. The selected gear ratio may be based on an input from a gear selection device (e.g., a gear shifter or PRNDL input). In addition, other inputs such as steering angle, throttle position, and engine speed may also be used to control operation of the gerotor pump assembly 50.

Torque that is provided to the second wheel set 38 by the gerotor pump assembly 50 may be controlled or modulated by operation of the first inlet valve 102 in the forward direction multi-wheel drive operation mode or by operation of second inlet valve 104 in the reverse direction multi-wheel drive operation mode. For example, in the forward direction multi-wheel drive operation mode the volume and or flow rate of fluid 72 to the piston 92 and hence the associated clutch actuation pressure exerted by the piston 92, may be decreased by modulating the first inlet valve 102 to reduce flow of the fluid 72 to the gerotor pump 66. The first inlet valve 102 may be cycled (such as with pulse width modulation) at a predetermined rate to provide a desired fluid volume or flow rate. Similar control may be obtained in the reverse direction multi-wheel drive operation mode by modulating the second inlet valve 104. Such control algorithms may be calculated or predetermined and executed by operation of the controller 120.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multi-wheel drive system for a vehicle comprising:
   a gerotor pump assembly having a first shaft that provides a torque to a gerotor pump and a second shaft that is connected to a second wheel set;
   a fluid source that is configured to provide a fluid to the gerotor pump assembly; and
   a first inlet valve and a second inlet valve that are disposed in parallel and that are fluidly connected to the fluid source and the gerotor pump assembly;
   wherein the gerotor pump assembly provides torque to the second wheel set when the first inlet valve is open, the second inlet valve is closed, and the first shaft rotates in a first rotational direction and the gerotor pump assembly provides torque to the second wheel set when the first inlet valve is closed, the second inlet valve is open, and the second shaft rotates in a second rotational direction.

2. The system of claim 1 wherein the gerotor pump assembly is disposed in a transfer case.

3. The system of claim 1 wherein the gerotor pump assembly includes a clutch that is actuated to transmit torque to the second wheel set.

4. The system of claim 3 wherein the gerotor pump assembly further comprises a piston that is actuated by the fluid that is pressurized by the gerotor pump to actuate the clutch to provide torque to the second wheel set.

5. The system of claim 4 further comprising a first check valve that is disposed between a second port of the gerotor pump and the piston and a second check valve that is disposed between a first port of the gerotor pump and the piston.

6. The system of claim 5 wherein the fluid passes through the first check valve but not the second check valve when the first inlet valve is open and the second inlet valve is closed.

7. The system of claim 5 wherein the fluid passes through the second check valve but not the first check valve when the second inlet valve is open and the first inlet valve is closed.

8. The system of claim 1 wherein torque is not provided to the second wheel set when the first inlet valve and the second inlet valve are open.

9. The system of claim 1 wherein torque that is provided to the second wheel set when the vehicle is moving in the first direction is modulated by the first inlet valve.

10. The system of claim 9 wherein torque that is provided to the second wheel set is decreased by modulating the first inlet valve to reduce flow of the fluid to the gerotor pump.

11. The system of claim 1 wherein torque that is provided to the second wheel set when the vehicle is moving in the second direction is modulated by the second inlet valve.

12. The system of claim 11 wherein torque that is provided to the second wheel set is decreased by modulating the second inlet valve to reduce flow of the fluid to the gerotor pump.

13. The system of claim 1 wherein the first inlet valve is fluidly coupled to a first port of the gerotor pump and the second inlet valve is fluidly coupled to a second port of the gerotor pump, wherein the fluid enters the first port and exits the second port when the first inlet valve is open and the second inlet valve is closed.

14. The system of claim 13 wherein the fluid enters the second port and exits the first port when the second inlet valve is open and the first inlet valve is closed.

15. The system of claim 1 wherein torque is provided to the first shaft and a first wheel set by a drivetrain.

16. A method of controlling a multi-wheel drive system for a vehicle, the method comprising:
   providing a gerotor pump assembly having a gerotor pump, a clutch that is actuated by a fluid provided by the gerotor pump, a first shaft that is operatively coupled to a first wheel set, the gerotor pump, and the clutch, and a second shaft that is operatively coupled to a second wheel set and the clutch, wherein the gerotor pump is selectively fluidly coupled to a fluid source by a first inlet valve and a second inlet valve; and
   opening the first inlet valve and closing the second inlet valve to provide fluid to the gerotor pump to actuate the clutch to provide torque to the second wheel set when the first shaft rotates in a first rotational direction.

17. The method of claim 16 wherein torque provided to the second wheel set when the vehicle is moving in the first direction is controlled by modulating the first inlet valve.

18. The method of claim 16 further comprising opening the second inlet valve and closing the first inlet valve to provide fluid to the gerotor pump to actuate the clutch to provide torque to the second wheel set when torque is provided to a first wheel set and the first shaft rotates in a second rotational direction.

19. The method of claim 18 wherein torque provided to the second wheel set when the vehicle is moving in the second direction is controlled by modulating the second inlet valve.

20. The method of claim 16 further comprising a pressure sensor that detects fluid pressure between the gerotor pump and a piston that actuates the clutch, wherein an amount of torque that is provided to the second wheel set is based on data from the pressure sensor.

* * * * *